(12) United States Patent  
Oku et al.

(10) Patent No.: US 6,791,461 B2
(45) Date of Patent: Sep. 14, 2004

(54) OBJECT DETECTION SENSOR (75) Inventors: Shin-ichi Oku, Ohtsu (JP); Yoshinori Tatsumi, Ohtsu (JP); Akihiko Hayashi, Ohtsu (JP); Maki Takeguchi, Ohtsu (JP)

(73) Assignee: Optex Co., Ltd., Shiga-ken (JP)

( * ) Notice: Subject to any disclaimer, the term of this patent is extended or adjusted under 35 U.S.C. 154(b) by 252 days.

(21) Appl. No.: 10/083,480

(22) Filed: Feb. 27, 2002

(65) Prior Publication Data

US 2002/0118113 A1 Aug. 29, 2002

(30) Foreign Application Priority Data

Feb. 27, 2001 (JP) ........................................ 2001-051503

(51) Int. Cl.⁷ ............................................. G08B 23/00
(52) U.S. Cl. ................. 340/573.1; 340/573.4; 340/573.5; 340/521; 340/522; 340/541
(58) Field of Search ............................ 340/573.1, 573.4, 340/573.5, 521, 522, 541, 552, 565; 600/300, 301, 587, 592

(56) References Cited

U.S. PATENT DOCUMENTS 5,754,225 A * 5/1998 Naganuma .................. 348/155
6,137,407 A * 10/2000 Akagawa et al. ........... 340/552

FOREIGN PATENT DOCUMENTS

JP 7-229972 8/1995

* cited by examiner

Primary Examiner—Jeffery Hofsass
Assistant Examiner—Hung Nguyen
(74) Attorney, Agent, or Firm—Wenderoth, Lind & Ponack, L.L.P.

(57) ABSTRACT

Cameras 31, 32 take images of an image space around a door. A distance calculation unit 33 calculates the distance to an object in the taken images. A coordinate transformation unit 34 detects the three-dimensional position of the object in the image space. The image space covered by the cameras 31, 32 is divided into a plurality of voxels. Some of these voxels are optionally set as constituents of the detection area. A judgement unit 36 judges whether the detected three-dimensional position of the object locates within or outside the detection area. If the object is present within the detection area, an output unit 37 produces an object detection signal, so that the door is allowed to open.

24 Claims, 10 Drawing Sheets

OBJECT DETECTION SENSOR

BACKGROUND OF THE INVENTION

The present invention relates to an object detection sensor which can be used as an automatic door sensor and the like. In particular, the present invention is concerned with measures to increase the degree of freedom in the setting of a detection area.

Figure 10:
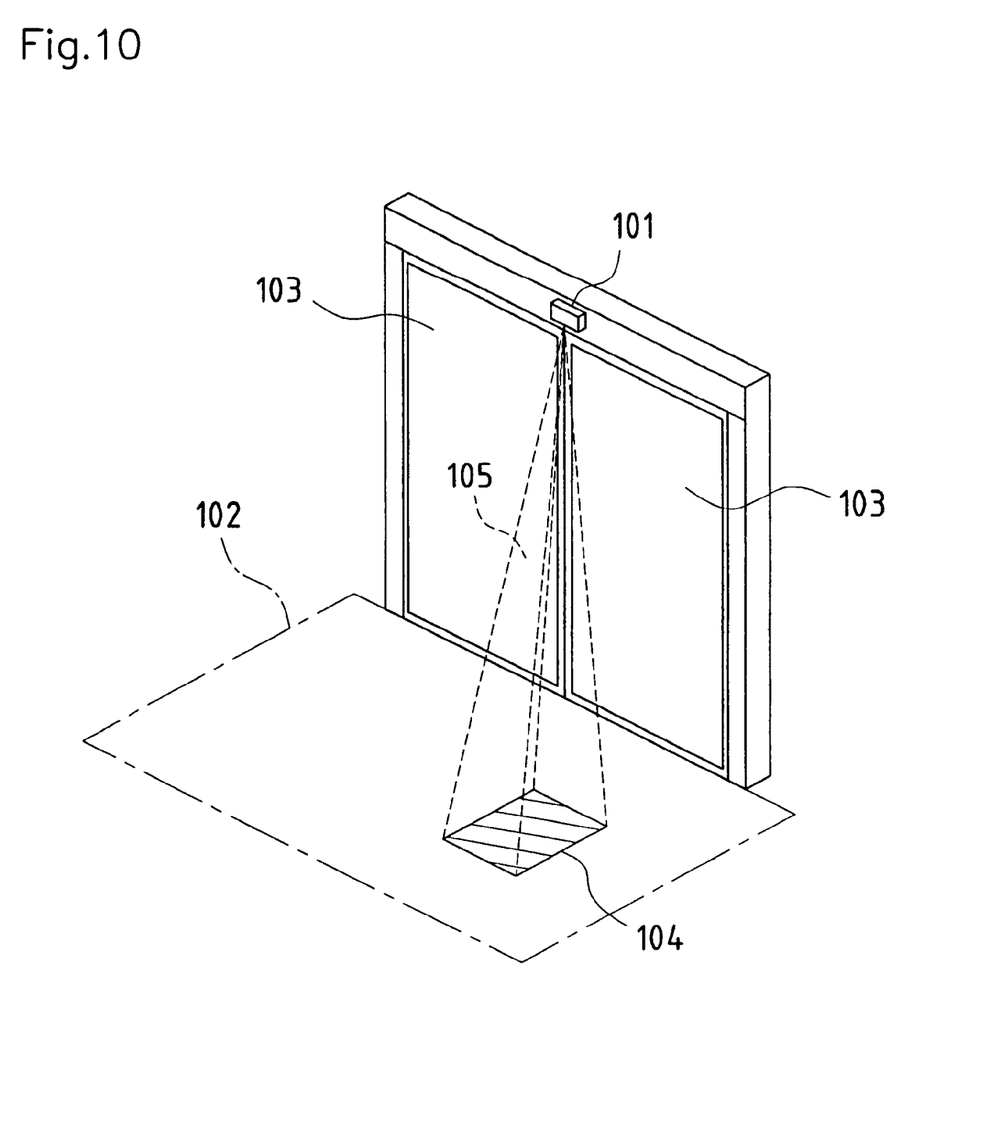
FIG. 10 is an illustration for describing an operation of a conventional infrared sensor, with a mask area defined in its detection area.

As an example of the conventional automatic door sensor, Japanese Patent Laid-open Publication No. H7-229972 discloses an active infrared sensor, as shown in FIG. 10, which is equipped with a transmitter and a receiver. In this infrared sensor 101, while the transmitter emits infrared light toward a predetermined detection area 102 (defined by a chain-dotted line in FIG. 10), the light is reflected and received by the receiver. If a person or like object enters the detection area 102, the receiver receives the infrared light in a different state. The sensor 101 detects this change as approach of an object to an automatic door 103. On detection of the object, the sensor 101 sends an object detection signal to an automatic door controller (not shown), so that the automatic door controller starts a door driving source (a driving motor) to open the automatic door 103.

In some applications of the active infrared sensor, detection of objects may be partially unnecessary in the detection area 102. Such a no-detection area is provided by masking. By way of example, the detection area 102 in FIG. 10 has a near-square contour as viewed in plan view. In this detection area 102, a shaded area 104 on the floor can be masked by emitting no infrared light toward the mask area 104. Alternatively, while infrared light is emitted to the entire detection area 102, the light reflected in the mask area 104 may be cancelled in a signal processing.

Another type of automatic door sensor is an image sensor which is equipped with a camera having a built-in image pickup element (e.g. CCD). This image sensor utilizes the camera to take an image of a detection area, and, based on the image information, judges the presence or absence of an object in the detection area. Also in the image sensor, the detection area may include a part where detection of objects is not required (a mask area). The mask area can be obtained by taking no image of the mask area or by cancelling the image of the mask area in a signal processing.

Nevertheless, these conventional sensors have following problems.

Referring to FIG. 10, when the mask area 104 is set in the infrared sensor, a mask space 105 is created over the area 104 (as defined by dashed lines). In other words, setting of the mask area 104 is inevitably accompanied with a mask space 105 which assumes the contour of a substantially quadrangular pyramid with the base of the mask area 104. The contour of the mask space 105 depends on the position of the infrared sensor 101 (the sensor in FIG. 10 is mounted on the transom) as well as the position and contour of the mask area 104. Therefore, it is impossible to set the mask area 104 on the floor (the two-dimensional mask area on the floor) separately from the mask space 105 (the three-dimensional mask area in the infrared light emission space). This restriction has been an obstacle to increase the degree of freedom in the setting of a detection area. A similar problem arises when the image sensor sets a mask area.

Figure 11:
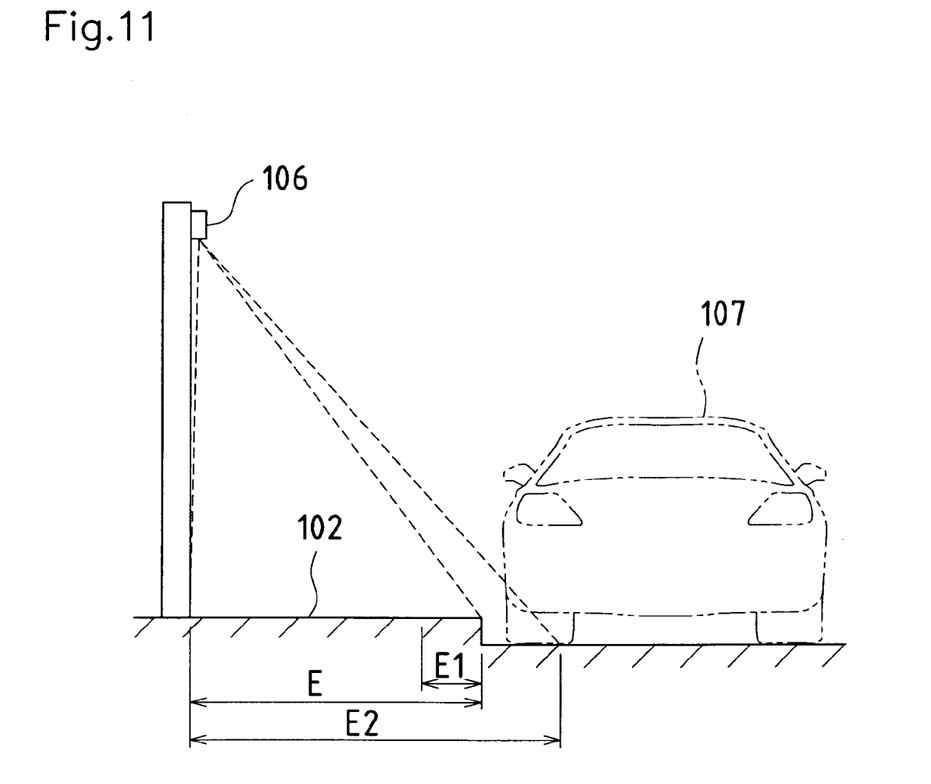
FIG. 11 is an illustration for describing an operation of a conventional infrared sensor, in the case where its detection area is extended.

Turning to FIG. 11, the infrared sensor sets the detection area 102 on the floor to have a depth E (the sidewise dimension in the drawing), in an attempt to detect a person or the like that enters the range of the depth E. In operation, however, the detection sensitivity is low along the end of the detection area 102 (e.g. the area indicated as the depth E1 in the drawing). Hence, in order to ensure a high detection sensitivity at the end area, the depth of the detection area 102 on the floor is generally set greater than the required depth E, as far as the depth E2 in the drawing.

In this case, however, a sensor 106 may detect an object which is present at the outside of the required detection area (the range of the depth E), which causes misoperation of the automatic door. For example, referring to FIG. 11, suppose that the detection object is a person passing on a pavement, and that the depth E corresponds to the pavement. It is further supposed that a driveway is adjacent to the outside of the depth E. In this situation, if the detection area 102 is set greater than the depth E, the sensor 106 detects a vehicle 107 travelling on the driveway, and unnecessarily opens the door whenever a vehicle 107 passes through the detection area 102.

SUMMARY OF THE INVENTION

The present invention is made in view of these problems. An object of the present invention is to provide an object detection sensor which is capable of setting an optional detection area and preventing improper detection.

In order to accomplish this object, the present invention takes an image of a detection area by image pickup means such as a CCD camera. In this image, the distance to an object is calculated. Based on the calculated distance, the sensor detects the three-dimensional position of the object in the image space, and compares the detected position with an object detection space which is registered in advance. Through this process, the sensor identifies the presence or absence of an object within the object detection space. In addition, the object detection space can be set in an optional three-dimensional contour.

An object detection sensor corresponding to claim 1 (hereinafter mentioned as Invention 1) is equipped with image taking means, distance calculation means, position detection means, detection space registration means, judgement means and output means. The image taking means is capable of taking an image of a predetermined image space. The distance calculation means calculates a distance between the image pickup means and an object observed in the image of the image space, on receiving an output from the image pickup means. The position detection means detects a three-dimensional position of an object in the image space, on receiving an output from the distance calculation means. In this position detection means, the position of an object is detected with respect to the object for which the distance from the image taking means is calculated, based on the calculated distance. The detection space registration means is capable of setting an optional mask space in the image space which is covered by the image taking means. This detection space registration means registers a space in the image space, excluding the mask space, as an object detection space. The judgement means judges whether the detected three-dimensional position of the object locates within or outside the registered object detection space, on receiving outputs from the position detection means and the detection space registration means. The output means outputs an object detection signal, on receiving an output from the judgement means. This object detection signal is produced, with a proviso that the detected three-dimensional position of the object locates within the registered object detection space.

An object detection sensor corresponding to claim 2 (hereinafter mentioned as Invention 2) adopts a different type of detection space registration means. This detection space registration means registers, as an object detection space, an optional space in the image space which is covered by the image taking means.

According to these features, when the image pickup means takes an image, the distance calculation means calculates the distance between the image pickup means and an object observed within the image. Based on the information, the position detection means detects the three-dimensional position of the object. On the other hand, the detection space registration means registers an object detection space which is set in an optional three-dimensional contour by a user. The judgement means judges whether the detected three-dimensional position of the object locates within or outside the registered object detection space. If the object is present within the object detection space, the output means produces an object detection signal. For example, where this object detection sensor is applied to an automatic door, the door is made open in response to the detection of an object.

An object detection sensor corresponding to claim 3 (hereinafter mentioned as Invention 3) is featured by a specific manner of setting the object detection space which is registered in the detection space registration means. Namely, the image space covered by the image pickup means is divided into a plurality of space elements in a cubic lattice pattern. As the object detection space, the detection space registration means registers a space which is composed of a part of these space elements.

With this feature, a user can optionally set the three-dimensional coordinates of space elements which correspond to an object detection space, considering which of the space elements in the image space should constitute to the object detection space. Thus, it is possible to set the object detection space in an optional contour, simply by setting the coordinates of some space elements.

With respect to any of Invention 1, Invention 2 or Invention 3, an object detection sensor corresponding to claim 4 (hereinafter mentioned as Invention 4) is featured by a specific operation of the output means for producing the object detection signal. In detail, this object detection sensor is installed as a sensor for an automatic door and associated with means for controlling an open/close drive of the door along the track. The output means is arranged to be capable of outputting the object detection signal to the door drive control means, such that the object detection signal outputted to the door drive control means causes the door to open fully.

Owing to this feature, the detection area around the door can be set in an optional contour. As a result, the object detection sensor can avoid improper detection and thereby improve the reliability in the opening/closing action of the automatic door.

With respect to any one of Invention 1 to Invention 4, object detection sensors corresponding to claim 5 and claim 6 (hereinafter mentioned as Invention 5 and Invention 6, respectively) are featured by specific operations of the distance calculation means for calculating the distance between the image pickup means and the object. Namely, the sensor of Invention 5 employs image pickup means which has a plurality of image pickup elements. In this sensor, the distance calculation means calculates the distance between the image pickup means and the object by stereo image processing which utilizes parallax of images taken by these image pickup elements.

On the other hand, the sensor of Invention 6 employs image pickup means which has a variable focus lens. In this sensor, the distance calculation means calculates the distance between the image pickup means and the object, based on the degree of focus on the object which is observed in the image taken by the image pickup means.

These features enable accurate calculation of the distance between the image pickup means and the object. In particular, the sensor of Invention 6 can simplify the structure of the image pickup means, because it requires no more than one image pickup element.

BRIEF DESCRIPTION OF THE DRAWINGS

FIG. 5(a) shows voxels locating in a detection area, whereas

DESCRIPTION OF THE PREFERRED EMBODIMENTS

Embodiments of the present invention are hereinafter described with reference to the drawings. In these embodiments, the object detection sensor according to the present invention is applied as an automatic door sensor.

Figure 1:
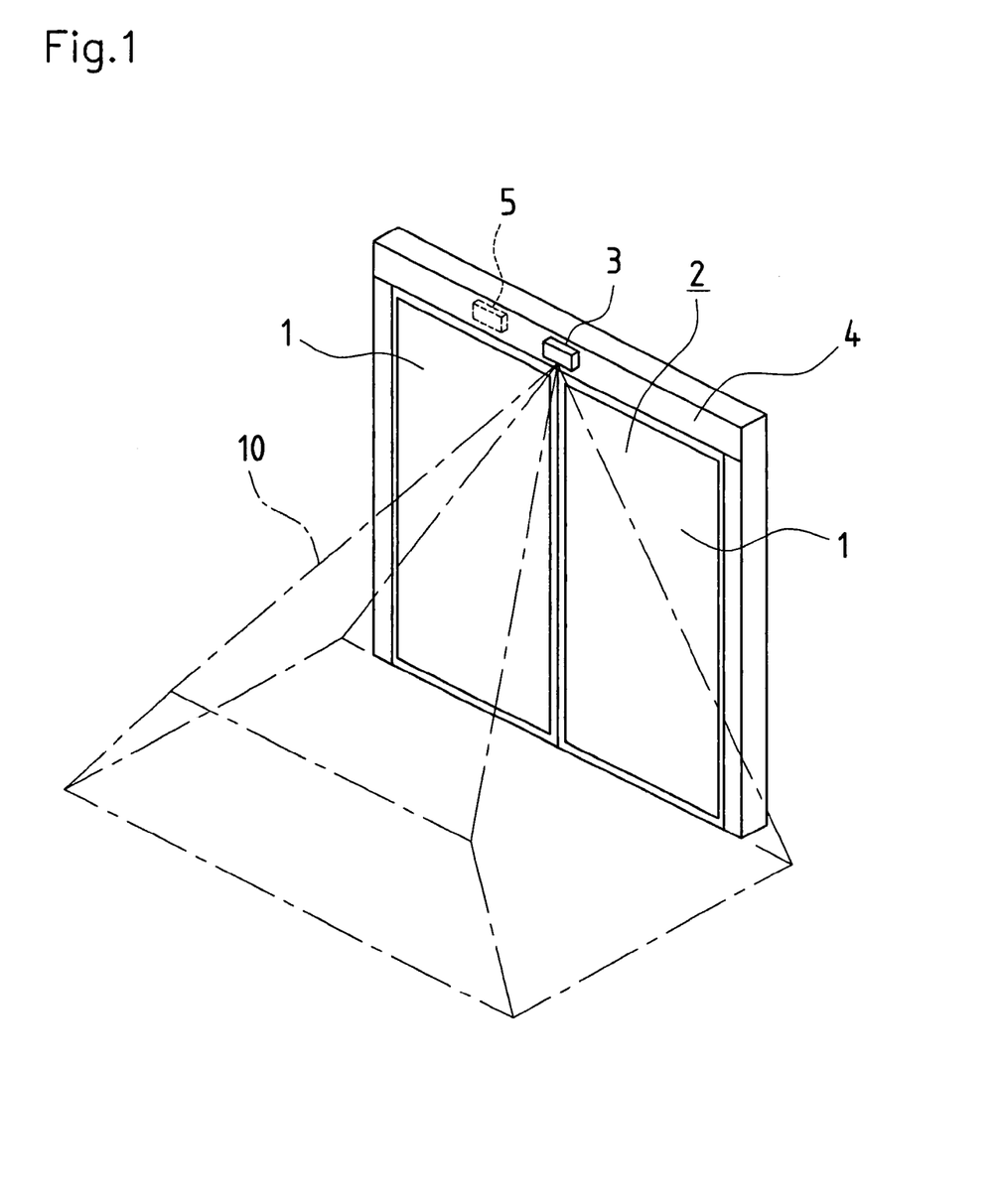
FIG. 1 is a perspective showing an automatic door and around a doorway of the automatic door, concerning an embodiment of the present invention.

FIG. 1 is a perspective view showing an automatic door and around a doorway of the automatic door, concerning this embodiment. As shown, the automatic door used in this embodiment is a bi-parting door which has two door segments 1, 1 movable in opening/closing directions (movable in horizontal directions) along a track at a doorway 2. For an automatic door sensor 3, a detection area 10 (an object detection space) is set on the interior of the doorway 2 (the three-dimensional detection area is defined by chain-dotted lines in the drawing). When a person or the like enters the detection area 10 (the setting operation of the detection area 10 will be mentioned later), the automatic door sensor 3 detects its presence and produces an object detection signal. This signal is sent to an automatic door controller 5 (door drive control means) housed in a transom 4. On receiving the object detection signal, the automatic door controller 5 starts a driving motor of a door opening/closing mechanism (not shown) and thereby opens the door segments 1, 1. Since the opening/closing mechanism of the door segments 1, 1 is well known in the art, its description is omitted herein.

Figure 2:
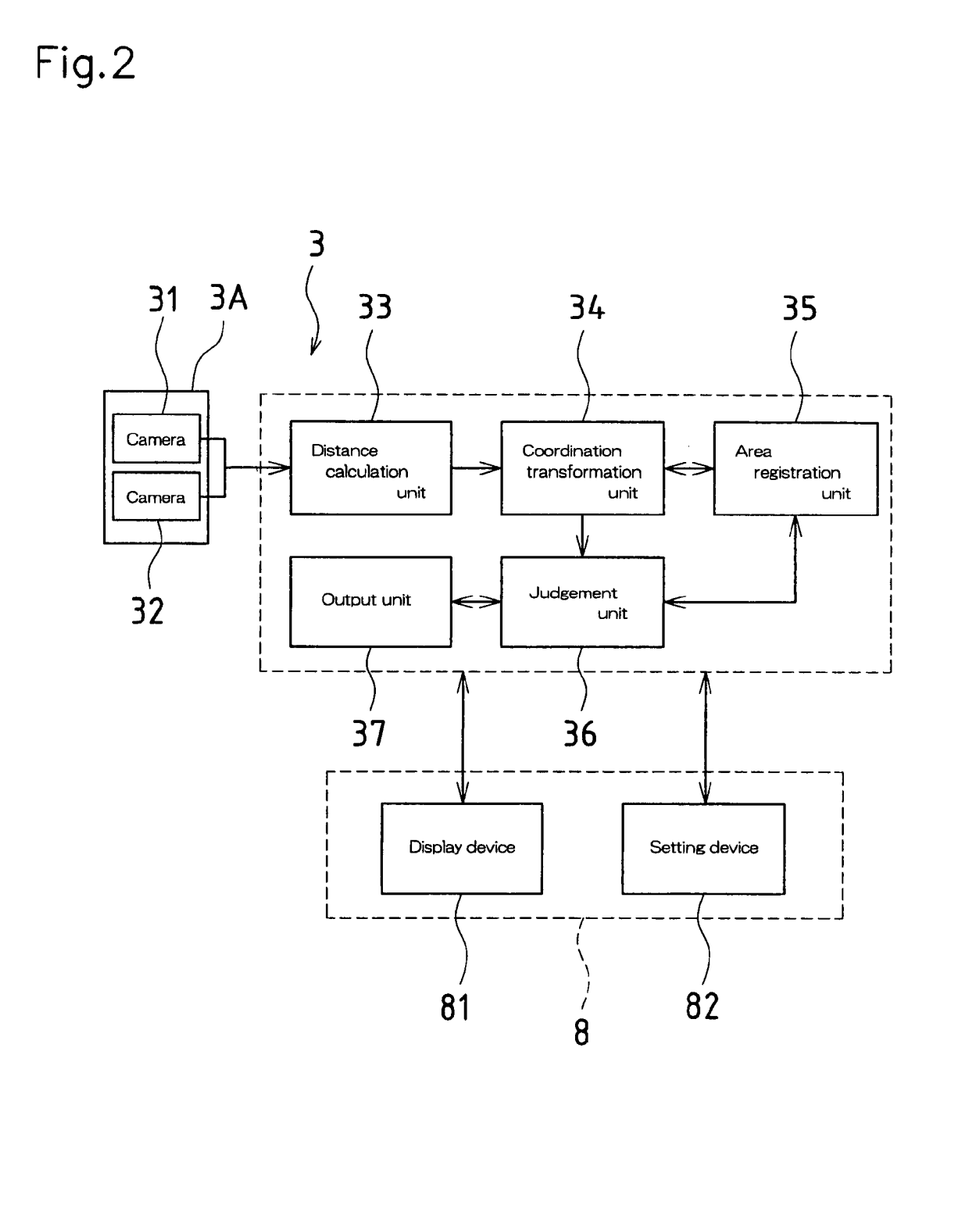
FIG. 2 is a block diagram showing the constitution of an automatic door sensor.

FIG. 2 is a block diagram showing the general constitution of the automatic door sensor 3. As shown, the sensor 3 is composed of two cameras 31, 32 (each having a built-in image pickup element such as CCD) as image pickup means, a distance calculation unit 33 as distance calculation means, a coordinate transformation unit 34 as position detection means, an area registration unit 35 as detection space registration means, a judgement unit 36 as judgement means, and an output unit 37 as output means.

The cameras 31, 32 are contained in a sensor casing 3A, with their optical axes oriented parallel to each other. The sensor casing 3A is mounted on the transom 4, such that image pickup directions of the cameras 31, 32 are oriented at predetermined elevation angles relative to the vertically downward direction. Thus, each of the cameras 31, 32 can take an image of a prescribed image space around the door segments 17

The distance calculation unit 33 receives information which relates to images taken by the cameras 31, 32. Then, the unit 33 calculates the distance between the cameras 31, 32 and an object in the images, by so-called stereo image processing. To be specific, between the image taken by the camera 31 and the image taken by the camera 32, the unit 33 measures displacement (i.e. "parallax") of an object observed in both images. The distance between the cameras 31, 32 and the object is calculated according to the following formula (1):

$$K=2af/S \qquad (1)$$

wherein K represents the distance between the cameras 31, 32 and an object, 2a indicates the spacing between the cameras 31, 32, f represents the focus distance of the lenses of the cameras 31, 32, and S represents the parallax.

In this embodiment, "the object for which the distance K from the cameras 31, 32 is calculated" encompasses all objects which are present in the above-defined image space, including a floor as well as a person and like object.

Figure 3:
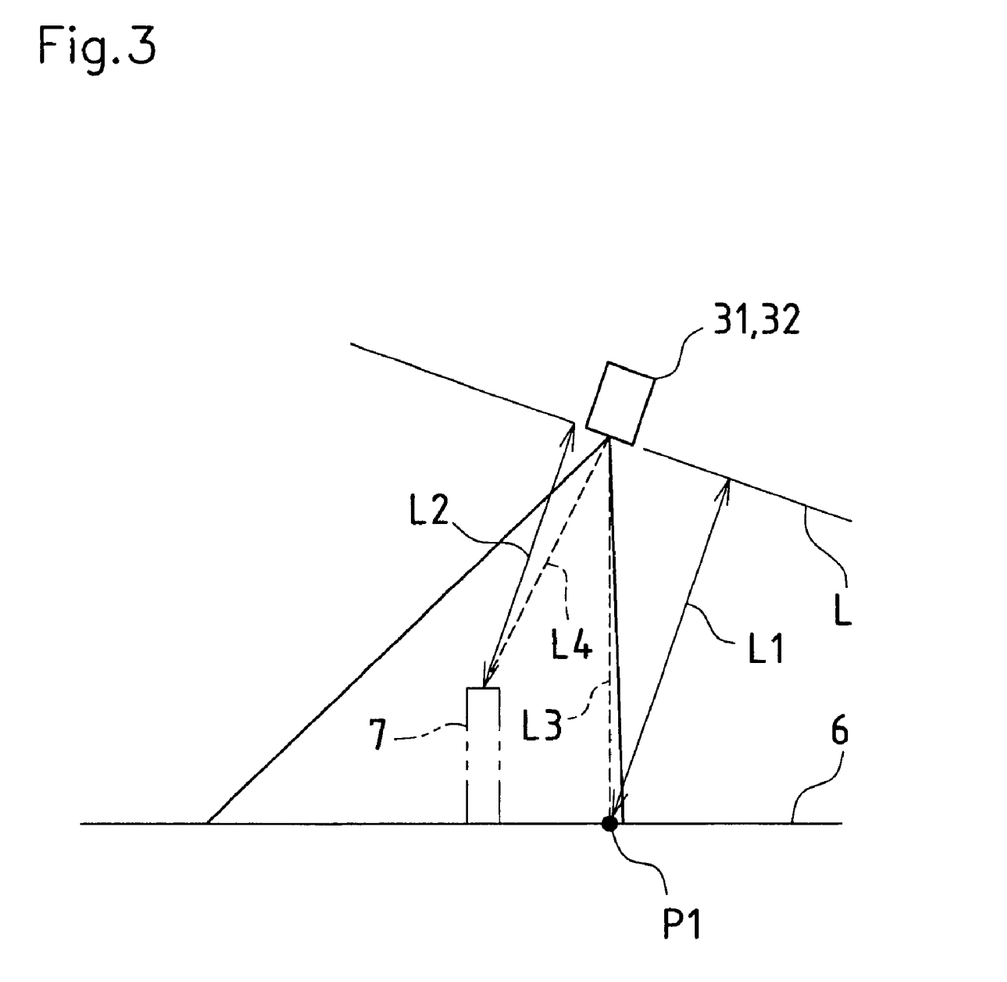
FIG. 3 is an illustration for describing an operation for calculating the distance between the cameras and an object.

Regarding the general stereo image processing, the distance between the cameras 31, 32 and an object is calculated as the distance of a straight line which extends orthogonally to the plane L in FIG. 3 (the plane L is a plane orthogonal to the image pickup direction of the cameras 31, 32), namely, as a linear distance parallel to the image pickup direction of the cameras 31, 32. To be specific, the distance from the cameras 31, 32 to the floor 6 (the point P1 which locates vertically under the cameras 31, 32) is calculated as L1. In the presence of an object 7 (depicted by an imaginary line in FIG. 3), the distance from the cameras 31, 32 to the object 7 is calculated as L2. To obtain the actual distance between the cameras 31, 32 and each object (L3 is the actual distance from the cameras 31, 32 to the floor 6, and L4 is the actual distance from the cameras 31, 32 to the object 7), the distance calculated by the foregoing computation is corrected by a trigonometric function. In some cases, the calculated distance can be directly used as the actual distance without a significant error. Then, it is possible to omit the distance correction and go to the next process.

The coordinate transformation unit 34 receives an output from the distance calculation unit 33. Then, with respect to the object for which the distance from the cameras 31, 32 is calculated, the unit 34 detects its three-dimensional position in the image space, based on the calculated distance, and thereby determines the position coordinates of the object. Specifically, the coordinate transformation unit 34 sets the approximate center of the door track on the floor 6 (the point P1 in FIG. 3) as the origin (0, 0, 0) of the three-dimensional coordinates. Taking the origin as a reference, the unit 34 is set to represent the position of the object in the taken images, in terms of three-dimensional coordinates. Incidentally, the point P1 on the floor 6 is detected in the following manner. In the test operation of the automatic door, after the distances from the cameras 31, 32 to all objects are calculated by the distance calculation unit 33, the unit 34 recognizes, as the floor 6, an object which locates vertically under the cameras 31, 32. To be more specific, in the test operation of the automatic door, the area vertically under the cameras 31, 32 is cleared of any object except the floor 6. In this situation, the distance calculation unit 33 calculates the distance to an object which lies vertically under the cameras 31, 32, and also detects a point which locates vertically thereunder in the images. The detected point is to be recognized as the point P1. Thus, the coordinate transformation unit 34 recognizes the positional relationship between the cameras 31, 32 and the floor 6, such as the mounting height and position of the cameras 31, 32 relative to the floor 6 (i.e. the height and position of the floor 6) and the elevation angle of the cameras 31, 32. Lastly, the point P1 is set as the origin (0, 0, 0) of the three-dimensional coordinates, so that the position of the object in the taken images can be represented by three-dimensional coordinates.

Figure 4:
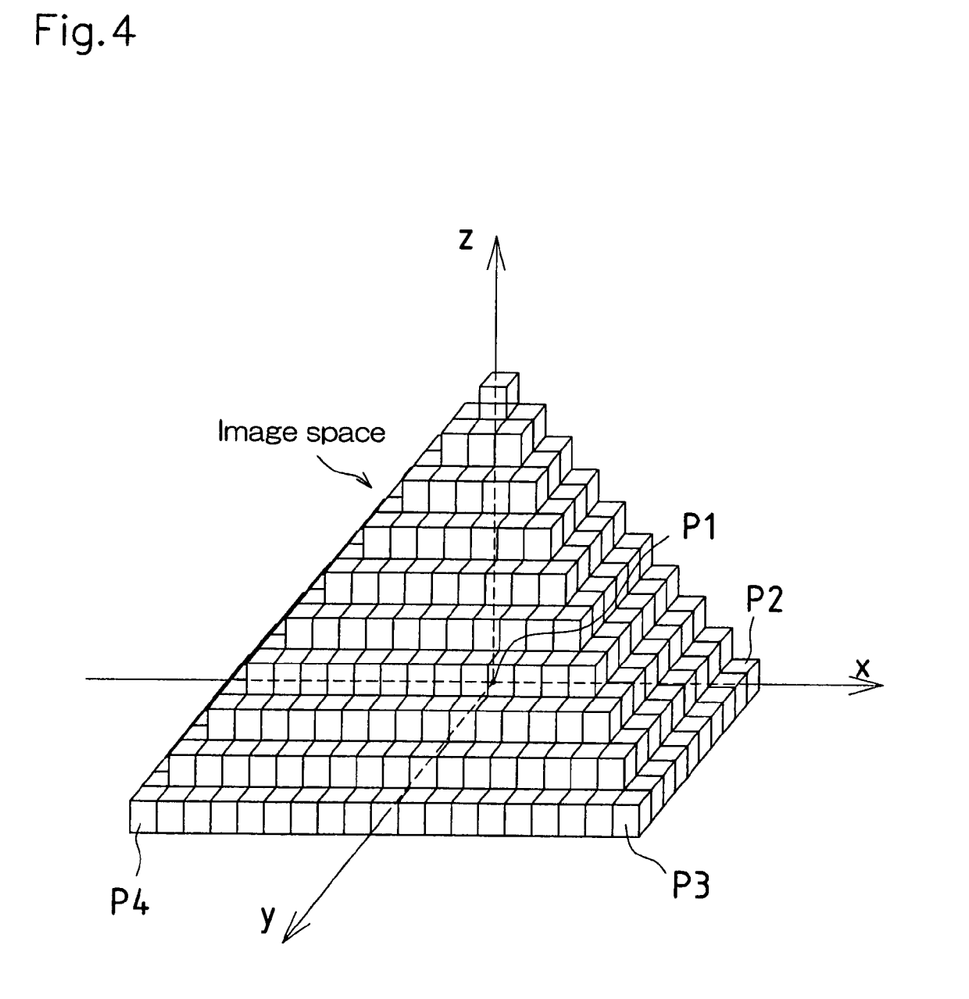
FIG. 4 is a perspective view of an image space which is divided into voxels.

The area registration unit 35 sets a certain mask space in the image space which is covered by the cameras 31, 32. An object detection space (the detection area 10) is defined as the space in the image space except the mask space, and registered in the unit 35 as such. The setting of the mask space is detailed below. First of all, the image space of which the cameras 31, 32 can take images is divided into a plurality of space elements in a cubic lattice pattern (hereinafter, these space elements are to be called voxels). FIG. 4 is a perspective view showing the image space (the space having a contour of a substantially quadrangular pyramid) which is divided into voxels. Each of the voxels is allotted with three-dimensional coordinates. Referring to FIG. 4, the voxel at the point P1 has coordinates (0, 0, 0); the voxel at P2 has coordinates (9, 0, 0) the voxel at P3 has coordinates (9, 9, 0); and the voxel at P4 has coordinates (−9, 9, 0), to give a few example. Secondly, a user sets a mask space by designating the voxels which locate within the space to be masked. Thereafter, the voxels in the mask space are excluded from the whole voxels on the three-dimensional coordinates, so that the voxels locating within the detection area 10 (the object detection space) can be determined Finally, regarding each of the voxels within the detection area 10, the three-dimensional coordinates are registered in the area registration unit 35. This object detection space is set, for example, by means of a personal computer 8 which is connected with the automatic door sensor 3. While an operator checks each voxel on a display device 81 (display) of the personal computer 8, he/she sets the object detection space by a setting device 82 (an input device such as a keyboard)

Figure 5A:
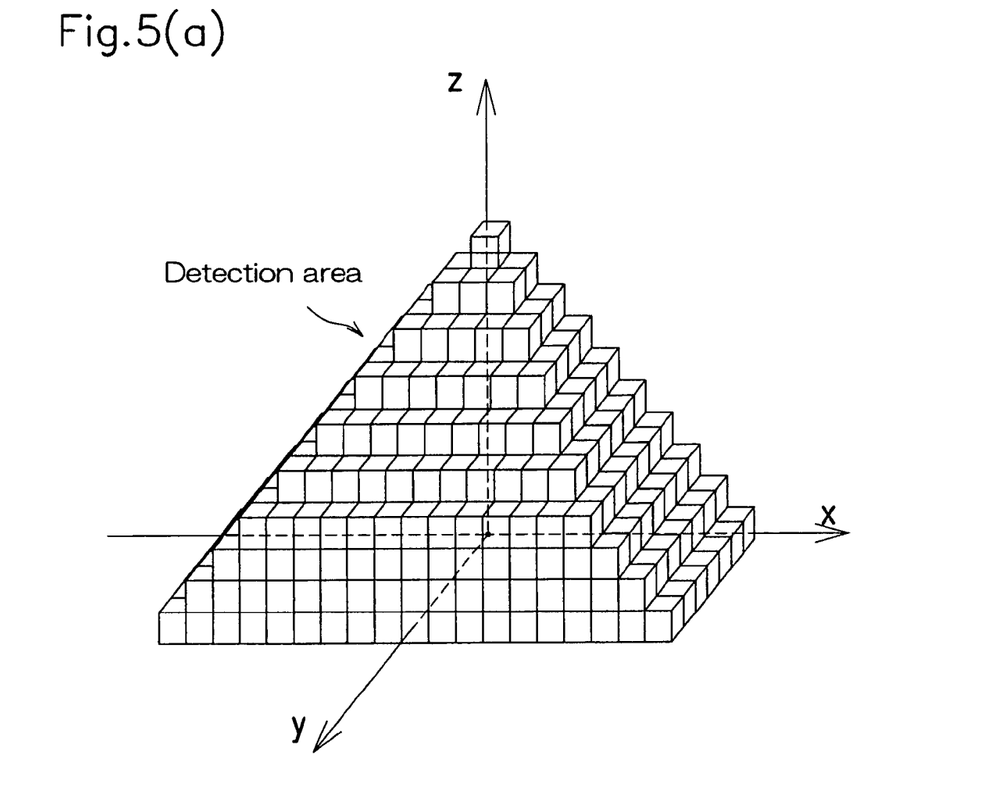
Figure 5B:
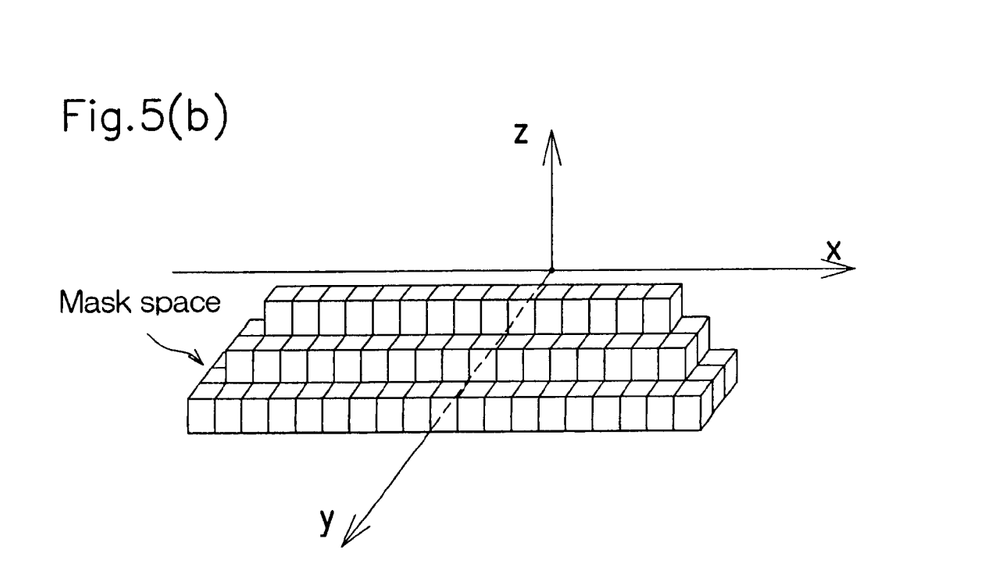
FIG. 5(b) shows voxels locating in a mask space.

By way of illustration, in order to set the detection area 10 as defined by chain-dotted lines in FIG. 1, the coordinates of the voxels shown in FIG. 5(b) are excluded from those of the whole voxels within the image space (see FIG. 4). Thus, the coordinates of the voxels locating in the detection area 10 are determined as those of the voxels shown in FIG. 5(a).

The judgement unit 36 receives outputs from the coordinate transformation unit 34 and the area registration unit 35, and judges whether the detected position of the object locates within or outside the registered detection area 10.

The output unit 37 receives an output from the judgement unit 36. Then, the unit 37 outputs an object detection signal to the automatic door controller 5, if the detected position of the object is within the registered detection area 10. In response to this signal, the automatic door controller 5 controls the driving motor of the door opening/closing mechanism to open the door segments 1, 1.

The object detection operation of this automatic door sensor 3 takes place in the following manner.

To begin with, in the test operation of an automatic door, the area vertically under the cameras 31, 32 is cleared of any object except the floor 6. In this situation, the distance calculation unit 33 calculates the distance to an object which is present vertically under the cameras 31, 32, based on the image information from the cameras 31, 32. In addition, the unit 33 detects a point which locates vertically under the cameras 31, 32 in the images. The coordinates of the voxel at the point P1 are set to (0, 0, 0).

During the normal operation of the automatic door after the test operation, the cameras 31, 32 take images of the detection area 10 at fixed time intervals. Information on the taken images is sent to the distance calculation unit 33, where the distance between the cameras 31, 32 and an object in the images taken by the cameras 31, 32 is calculated by the stereo image processing of these images as detailed above.

The data on the calculated distance to each object is sent to the coordinate transformation unit 34. Based on the calculated distance, the coordinate transformation unit 34 detects the three-dimensional position of the object for which the distance from the cameras 31, 32 is calculated, thereby determining the position coordinates of this object.

Subsequent to these operations, the judgement unit 36 receives outputs from the coordinate transformation unit 34 and the area registration unit 35. Then, the unit 36 judges whether the detected position of the object locates within or outside the registered detection area 10. If the presence of a person or like object is recognized in the detection area 10, a judgement signal is transmitted from the judgement unit 36 to the output unit 37. In response to this signal, the output unit 37 outputs an object detection signal to the automatic door controller 5. On receiving the object detection signal, the automatic door controller 5 keeps the door segments 1, 1 in the open state or opens the closing or closed door segments 1, 1.

Figure 6:
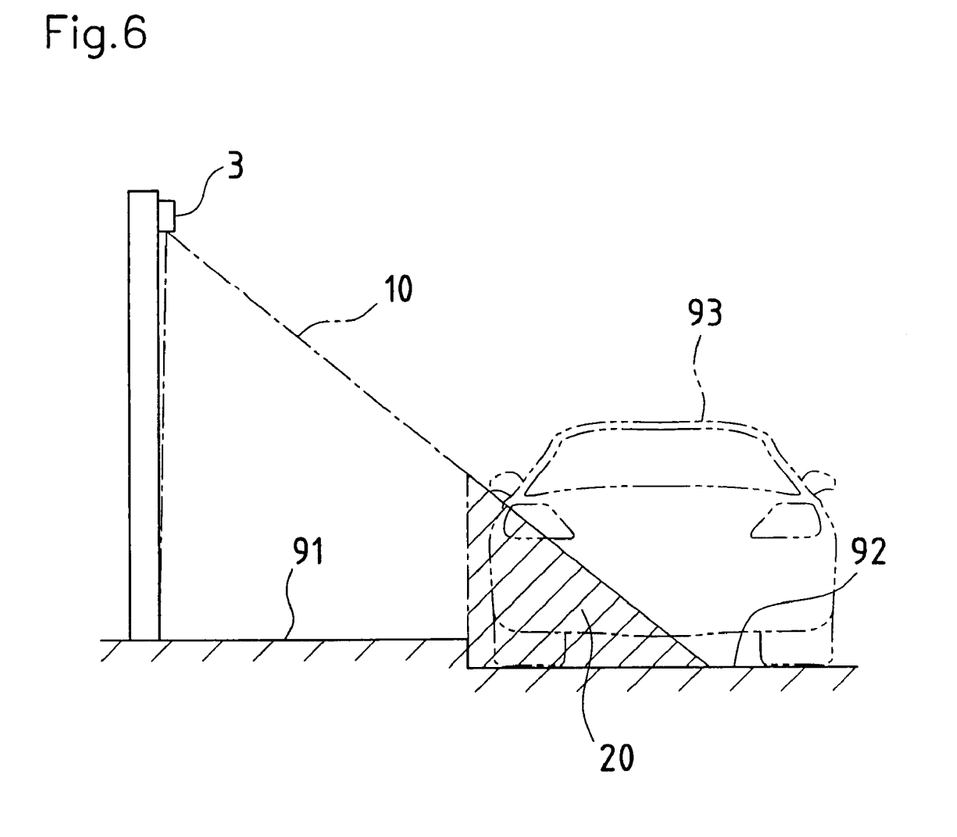
FIG. 6 illustrates an installation example of an automatic door sensor.

According to the above principle of the present embodiment, when images are taken by the cameras 31, 32 which covers the image space around the door, the sensor calculates the distance between the cameras 31, 32 and an object observed in the images. Based on the information, the sensor detects the three-dimensional coordinates of the object. Then, the sensor compares the three-dimensional coordinates of the object with the detection area 10 which is registered in advance. If the object locates within the detection area 10, the door segments 1, 1 are allowed to open. Besides, the detection area 10 can be set in an optional contour by dividing the image space into a plurality of voxels and setting optional voxels as the mask space. The effect of this structure can be particularly understood in the case where a pavement 91 and a driveway 92 are adjacent as illustrated in FIG. 6. If the sensor needs to detect a person passing on the pavement 91 and nothing on the driveway 92, a no-detection area 20 is set as the mask area (the shaded area in the drawing). As a result, the sensor can prevent unnecessary detection of a vehicle 93 and consequential misoperation of the automatic door, while maintaining a good detection sensitivity to a person passing on the pavement 91 (i.e. exhibit a high detection sensitivity over the entire pavement 91).

As a modified embodiment, the distance between the cameras 31, 32 and an object can be measured in a different manner. In this modification, the image pickup means is constituted with a camera having a variable focus lens. When this camera takes an image, the image information is sent to the distance calculation unit 33. The distance calculation unit 33 calculates the distance to the object, based on the degree of focus on the object which is observed in the image taken by the camera.

Figure 7:
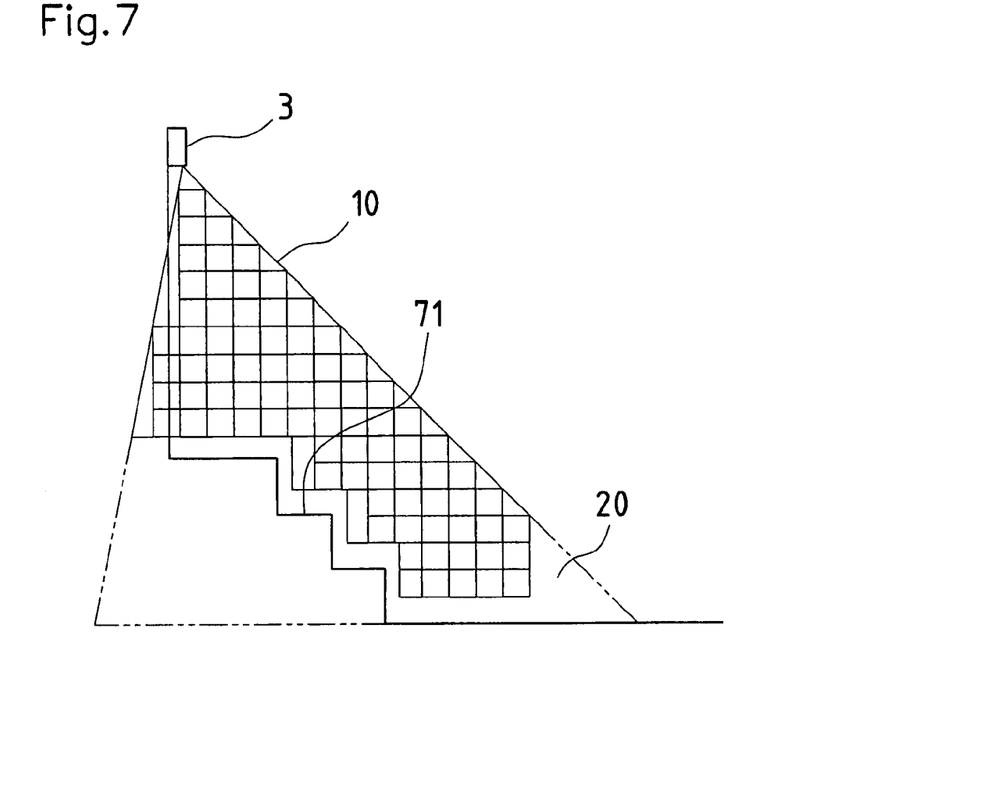
FIG. 7 illustrates another installation example of an automatic door sensor.
Figure 8:
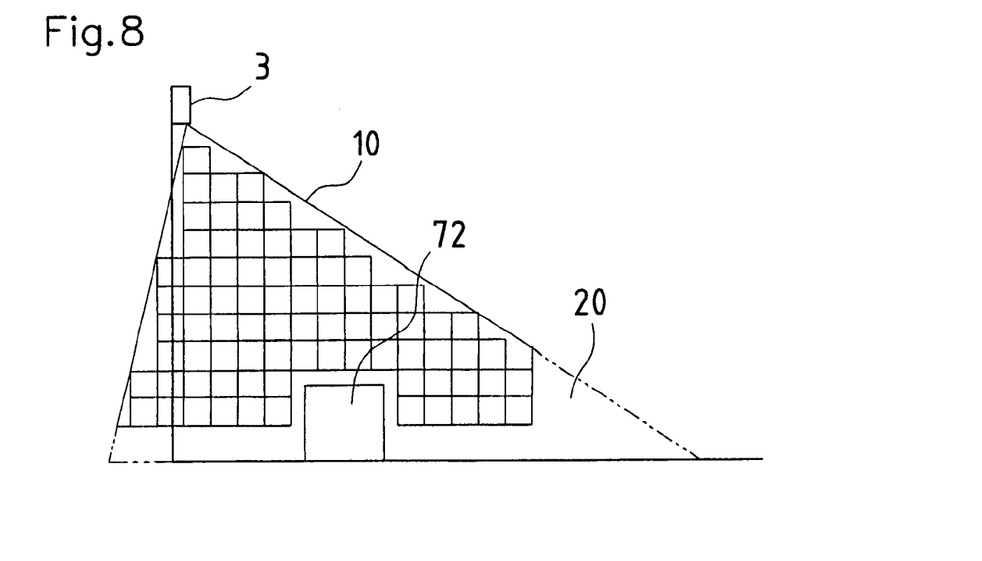
FIG. 8 illustrates a further installation example of an automatic door sensor.

In modified embodiments illustrated in FIG. 7 and FIG. 8, the automatic door sensor 3 is mounted in various situations. FIG. 7 shows the sensor 3 mounted near a stairway 71. In the case of FIG. 8, a fixed object 72 which need not be detected is installed in the image space.

In the embodiment of FIG. 7, the mask space 20 is set in conformity with the contour of the stairway 71 in order that voxels within the mask space 20 are excluded from the detection area 10. As for the embodiment of FIG. 8, the mask space 20 is set along the contour of the fixed object 72 in order that voxels within the mask space 20 are excluded from the detection area 10. These modifications prevent improper detection of the stairway 71 and the fixed object 72, thereby improving the reliability in the opening/closing action of the automatic door.

As far as the above embodiments are concerned, the automatic door sensor 3 according to the present invention is applied as an activation sensor, but the present invention should not be limited to such application. Additionally, this automatic door sensor can combine the functions of an activation sensor and a safety sensor, by extending the region to be covered by the cameras 31, 32. The sensor shown in FIG. 9 (a view equivalent to FIG. 1) has an extended image pickup region which is large enough to combine the functions of an activation sensor and a safety sensor.

Regarding the embodiment shown in FIG. 1, the automatic door sensor 3 serves as the activation sensor, in which the detection area 10 excludes the door with the intention of avoiding misoperation. In order to impart the function of a safety sensor to the sensor of FIG. 1, a safety sensor is mounted on the posts such that its detection area covers the door rail and its vicinity.

Figure 9:
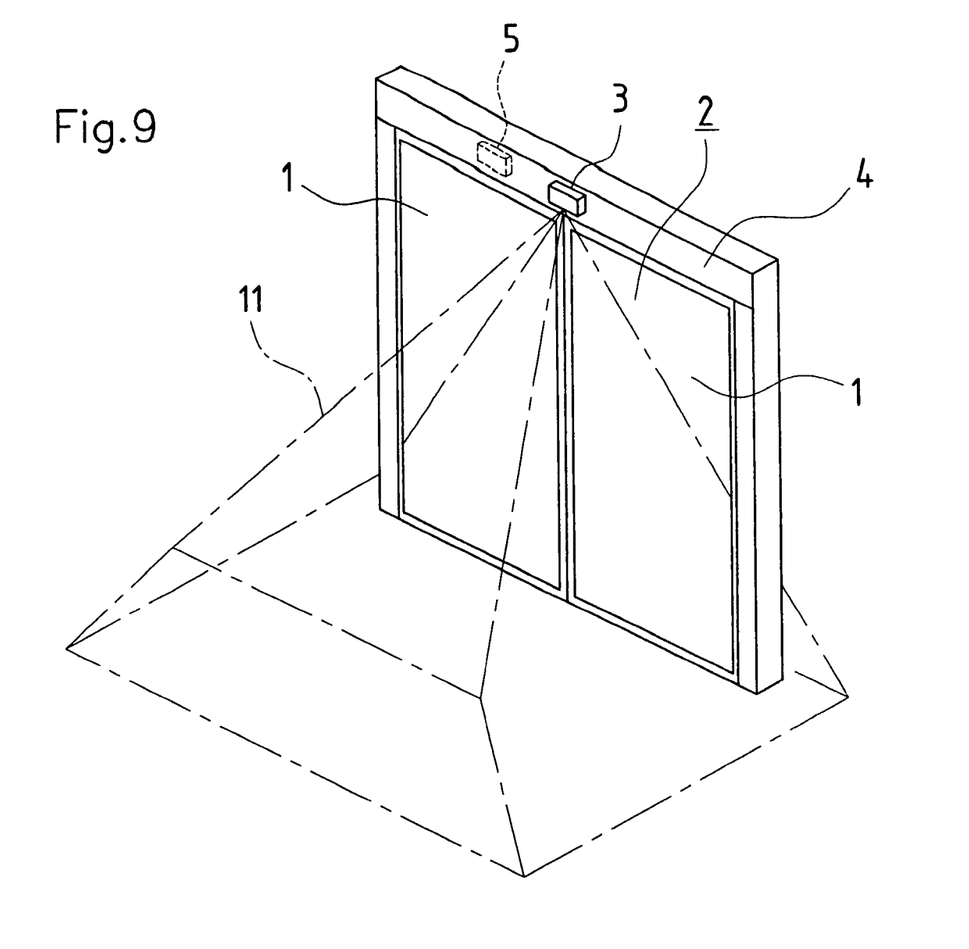
FIG. 9 is a view equivalent to FIG. 1, in which the automatic door sensor combines the functions of an activation sensor and a safety sensor.

In contrast, regarding the embodiment of FIG. 9, a detection area 11 of the automatic sensor 3 covers the door, thus including the area on and over the door rail. This sensor can achieve the functions of an activation sensor and a safety sensor in combination, without placing a separate safety sensor.

The present invention is applicable not only to bi-parting automatic doors, as in the above embodiments, but also to single-sliding automatic doors.

As a method for setting the detection area 10 in an optional contour, the present invention divides the image space into voxels. Additionally, the present invention can be arranged to set the detection area 10 in an optional contour in alternative manners.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. All changes which come within the meaning and range of equivalency of the claims are therefore intended to be embraced therein.

The present application is based on Japanese Patent Application No. 2001-51503, the content of which is incorporated herein by reference. In addition, the document cited in this specification is incorporated herein by reference in its entirety.

What is claimed is:

1. An object detection sensor which comprises:

image pickup means capable of taking an image of a predetermined image space;

means for calculating a distance between the image pickup means and an object observed in the image of the image space, the distance calculation means operating on receiving an output from the image pickup means;

means for detecting a three-dimensional position of an object in the image space, the object position detection means operating on receiving an output from the distance calculation means, wherein the position of an object is detected with respect to the object for which the distance from the image pickup means is calculated, based on the calculated distance;

means for registering a detection space, which is capable of setting an optional mask space in the image space covered by the image pickup means, and which registers a space in the image space, excluding the mask space, as an object detection space;

means for judging whether the detected three-dimensional position of the object locates within or outside the registered object detection space, the judgement means operating on receiving outputs from the position detection means and the detection space registration means; and means for outputting an object detection signal, the output means operating on receiving an output from the judgement means, wherein the object detection signal is produced, with a proviso that the detected three-dimensional position of the object locates within the registered object detection space.

2. An object detection sensor which comprises:

image pickup means capable of taking an image of a predetermined image space;

means for calculating a distance between the image pickup means and an object observed in the image of the image space, the distance calculation means operating on receiving an output from the image pickup means;

means for detecting a three-dimensional position of an object in the image space, the object position detection means operating on receiving an output from the distance calculation means, wherein the position of an object is detected with respect to the object for which the distance from the image pickup means is calculated, based on the calculated distance;

means for registering a detection space, which registers, as an object detection space, an optional space in the image space covered by the image pickup means;

means for judging whether the detected three-dimensional position of the object locates within or outside the registered object detection space, the judgement means operating on receiving outputs from the position detection means and the detection space registration means; and means for outputting an object detection signal, the output means operating on receiving an output from the judgement means, wherein the object detection signal is produced, with a proviso that the detected three-dimensional position of the object locates within the registered object detection space.

3. An object detection sensor according to claim 1, wherein the image space covered by the image pickup means is divided into a plurality of space elements in a cubic lattice pattern, and wherein, as the object detection space, the detection space registration means registers a space which is composed of a part of the space elements.

4. An object detection sensor according to claim 1, which is installed as a sensor for an automatic door, wherein the sensor is associated with means for controlling an open/close drive of the door along a track, and wherein the output means is capable of outputting the object detection signal to the door drive control means, such that the object detection signal outputted to the door drive control means causes the door to open fully.

5. An object detection sensor according to claim 1, wherein the image pickup means has a plurality of image pickup elements; and wherein the distance calculation means calculates the distance between the image pickup means and the object by stereo image processing which utilizes parallax of images taken by these image pickup elements.

6. An object detection sensor according to claim 1, wherein the image pickup means has a variable focus lens; and wherein the distance calculation means calculates the distance between the image pickup means and the object, based on the degree of focus on the object which is observed in the image taken by the image pickup means.

7. An object detection sensor according to claim 2, wherein the image space covered by the image pickup means is divided into a plurality of space elements in a cubic lattice pattern, and wherein, as the object detection space, the detection space registration means registers a space which is composed of a part of the space elements.

8. An object detection sensor according to claim 2, which is installed as a sensor for an automatic door, wherein the sensor is associated with means for controlling an open/close drive of the door along a track, and wherein the output means is capable of outputting the object detection signal to the door drive control means, such that the object detection signal outputted to the door drive control means causes the door to open fully.

9. An object detection sensor according to claim 3, which is installed as a sensor for an automatic door, wherein the sensor is associated with means for controlling an open/close drive of the door along a track, and wherein the output means is capable of outputting the object detection signal to the door drive control means, such that the object detection signal outputted to the door drive control means causes the door to open fully.

10. An object detection sensor according to claim 7, which is installed as a sensor for an automatic door, wherein the sensor is associated with means for controlling an open/close drive of the door along a track, and wherein the output means is capable of outputting the object detection signal to the door drive control means, such that the object detection signal outputted to the door drive control means causes the door to open fully.

11. An object detection sensor according to claim 2, wherein the image pickup means has a plurality of image pickup elements; and wherein the distance calculation means calculates the distance between the image pickup means and the object by stereo image processing which utilizes parallax of images taken by these image pickup elements.

12. An object detection sensor according to claim 3,
wherein the image pickup means has a plurality of image pickup elements; and
wherein the distance calculation means calculates the distance between the image pickup means and the object by stereo image processing which utilize parallax of images taken by these image pickup elements.

13. An object detection sensor according to claim
wherein the image pickup means has a plurality of image pickup elements; and
wherein the distance calculation means calculates the distance between the image pickup means and the object by stereo image processing which utilizes parallax of images taken by these image pickup elements.

14. An object detection sensor according to claim 4,
wherein the image pickup means has a plurality of image pickup elements; and
wherein the distance calculation means calculates the distance between the image pickup means and the object by stereo image processing which utilizes parallax of images taken by these image pickup elements.

15. An object detection sensor according to claim 8,
wherein the image pickup means has a plurality of image pickup elements; and
wherein the distance calculation means calculates the distance between the image pickup means and the object by stereo image processing which utilizes parallax of images taken by these image pickup elements.

16. An object detection sensor according to claim 9,
wherein the image pickup means has a plurality of image pickup elements; and
wherein the distance calculation means calculates the distance between the image pickup means and the object by stereo image processing which utilizes parallax of images taken by these image pickup elements.

17. An object detection sensor according to claim 10,
wherein the image pickup means has a plurality of image pickup elements; and
wherein the distance calculation means calculates the distance between the image pickup means and the object by stereo image processing which utilizes parallax of images taken by these image pickup elements.

18. An object detection sensor according to claim 2,
wherein the image pickup means has a variable focus lens; and
wherein the distance calculation means calculates the distance between the image pickup means and the object, based on the degree of focus on the object which is observed in the image taken by the image pickup means.

19. An object detection sensor according to claim 3,
wherein the image pickup means has a variable focus lens; and
wherein the distance calculation means calculates the distance between the image pickup means and the object, based on the degree of focus on the object which is observed in the image taken by the image pickup means.

20. An object detection sensor according to claim 7,
wherein the image pickup means has a variable focus lens; and
wherein the distance calculation means calculates the distance between the image pickup means and the object, based on the degree of focus on the object which is observed in the image taken by the image pickup means.

21. An object detection sensor according to claim 4,
wherein the image pickup means has a variable focus lens; and
wherein the distance calculation means calculates the distance between the image pickup means and the object, based on the degree of focus on the object which is observed in the image taken by the image pickup means.

22. An object detection sensor according to claim 8,
wherein the image pickup means has a variable focus lens; and
wherein the distance calculation means calculates the distance between the image pickup means and the object, based on the degree of focus on the object which is observed in the image taken by the image pickup means.

23. An object detection sensor according to claim 9,
wherein the image pickup means has a variable focus lens; and
wherein the distance calculation means calculates the distance between the image pickup means and the object, based on the degree of focus on the object which is observed in the image taken by the image pickup means.

24. An object detection sensor according to claim 10,
wherein the image pickup means has a variable focus lens; and
wherein the distance calculation means calculates the distance between the image pickup means and the object, based on the degree of focus on the object which is observed in the image taken by the image pickup means.

* * * * *